Jan. 7, 1936.  L. L. WILLIAMS  2,027,215
METHOD OF MAKING MOLDINGS
Filed March 27, 1934  2 Sheets-Sheet 1
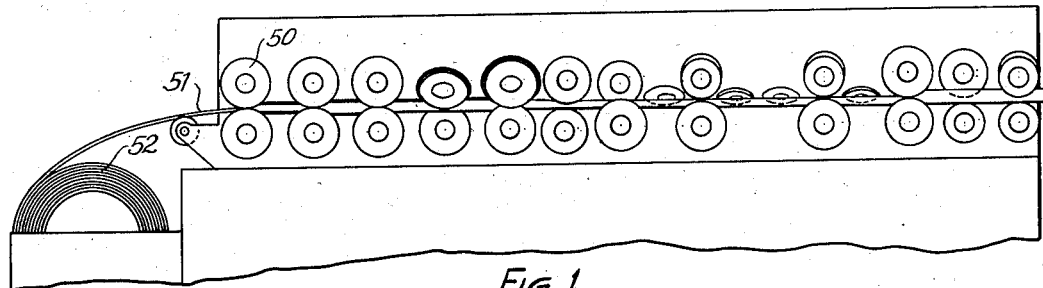
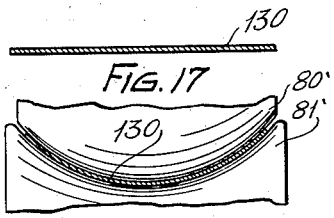
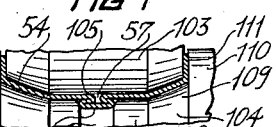
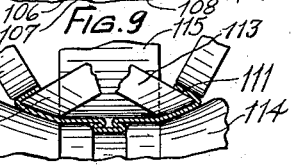
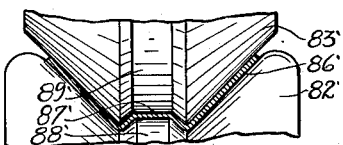
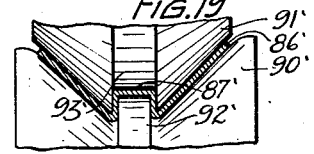
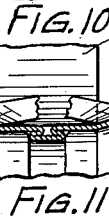
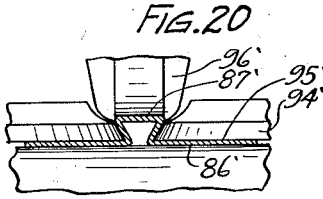
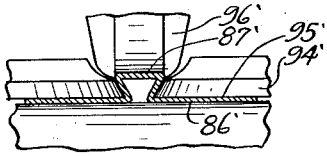
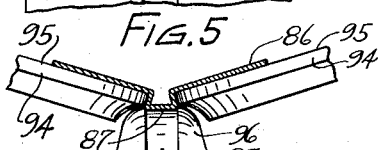
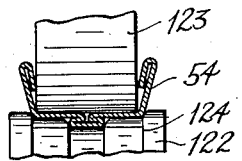
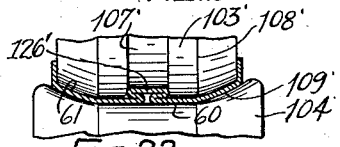
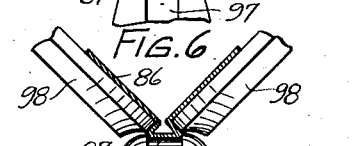
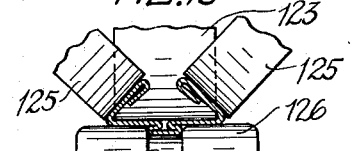
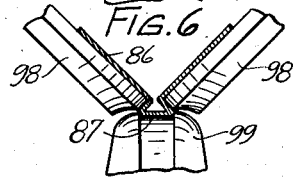
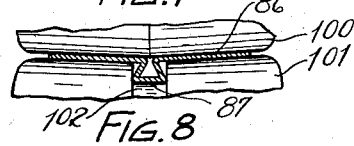
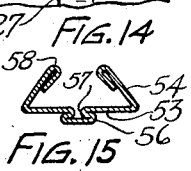
INVENTOR
LEO L. WILLIAMS
Kwis, Hudson & Kent
ATTORNEYS

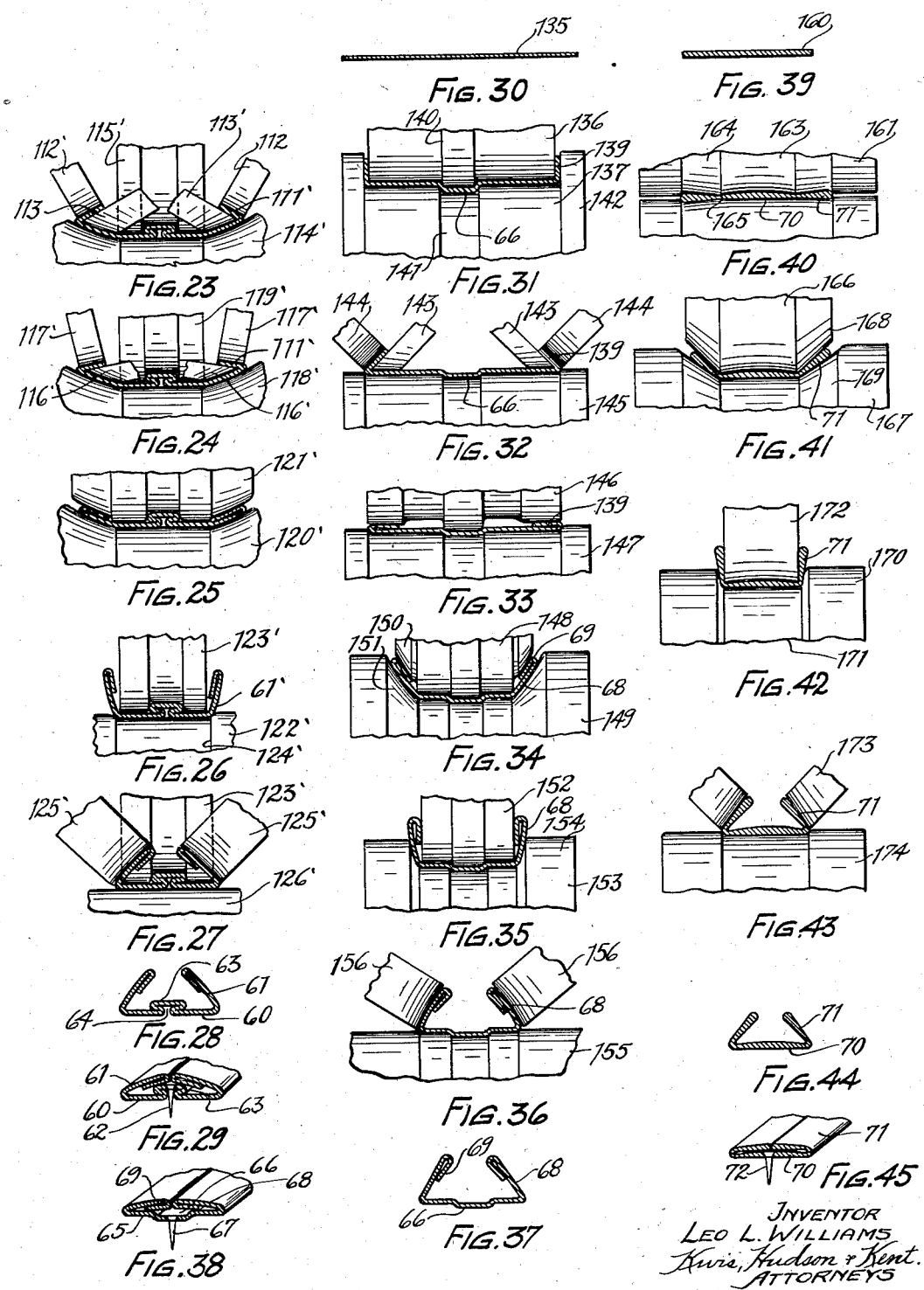

Patented Jan. 7, 1936

2,027,215

UNITED STATES PATENT OFFICE 2,027,215

METHOD OF MAKING MOLDINGS

Leo L. Williams, Cleveland Heights, Ohio

Application March 27, 1934, Serial No. 717,612

4 Claims. (Cl. 153—28)

This invention relates to a novel method of making moldings of the type adapted for use on automobile bodies for covering joints, for ornamentation, or for other purposes and, more specifically, relates to a novel method of economically producing such moldings from rolled strip stock. Moldings of this type, which have been formed from rolled strip stock, are disclosed in my copending application Serial No. 646,893, filed December 12, 1932, now Patent No. 1,958,527 issued May 15, 1934.

Heretofore moldings for this purpose have generally been formed of extruded metal, usually aluminum, and were composed of a base or body through which attaching nails or other devices extended, and wings or flanges attached to the base so that they were adapted to be bent down onto the base to conceal and cover the attaching devices and to provide a finished shape for the molding. Extruded moldings of this general type are illustrated in my prior Patents 1,714,478, 1,714,479 issued May 21, 1929 and 1,771,386, issued July 22, 1930.

In the development of these moldings it was found quite important that the base or the wings, or both, be so shaped that in the closing operation the wings would be stopped at a given point or would assume the correct position to give the predetermined external shape to the molding without expensive filing or grinding operations. Highly successful moldings embodying these developments are illustrated in the second and third of my prior patents referred to above.

Although extruded moldings of the type referred to above have been generally successful and satisfactory, they are relatively expensive to produce. One factor which increases the cost of extruded moldings is that only certain metals are adapted for extruding operations, for example, aluminum and aluminum alloys, and these metals are relatively costly. Another factor tending to increase the cost of extruded moldings is that the dies constituting a part of the extruding apparatus must be very carefully and accurately constructed, usually by highly skilled workmen, and these dies accordingly represent a considerable item of expense in the production of extruded moldings.

The principal object of the present invention is to provide a novel method of producing moldings, of the type mentioned, whereby the moldings can be constructed from relatively inexpensive material, and without involving the cost of expensive extruding apparatus.

Another object of the invention is to provide a method of making moldings, of the type referred to, wherein side portions of a strip of rolled metal stock are bent inwardly with respect to an intermediate portion of the strip whereby the intermediate portion forms the base of the molding and the side portions form wings which are adapted to be bent or folded further to close the molding and to conceal attaching devices extending through the base.

A further object of the invention is to provide a novel method of making moldings of the type referred to wherein an intermediate portion of a strip of rolled metal stock is shaped and thereby thickened to form the base of the molding, and side portions of the strip are bent inwardly with respect to the base to form wings which are adapted to be folded further to close the molding.

Other objects and advantages of the invention will be apparent from the following description when taken in conjunction with the accompanying sheets of drawings, wherein Fig. 1 is an elevational view, more or less diagrammatic in form, showing apparatus with which my method of economically producing moldings may be carried out.

Fig. 2 is a cross sectional view showing strip metal stock from which a molding may be formed by my novel method.

Figs. 3 to 14 inclusive are partial elevational views showing the progressive shaping of the strip stock in producing one form of molding.

Fig. 15 is a sectional view showing the completed molding.

Fig. 16 is a perspective view of a short section of the same molding but showing the molding closed over the attaching devices.

Figs. 17 to 27 inclusive are partial elevational views illustrating the progressive shaping of strip stock in forming another molding according to my method.

Fig. 28 is a cross sectional view showing the completed molding.

Fig. 29 is a perspective view of a short section of the same molding but showing the molding closed over the attaching devices.

Figs. 30 to 36 inclusive are partial elevational views illustrating the application of my method to the production of another form of molding.

Fig. 37 is a cross section showing the completed molding.

Fig. 38 is a perspective view of a short section of the same molding but with the molding closed over the attaching devices.

Figs. 39 to 43 inclusive are views illustrating the application of my method to the production of still another form of molding.

Fig. 44 is a cross section of the completed molding, and

Fig. 45 is a perspective view of a short section of the molding but showing the molding closed over the attaching devices.

Detailed reference will presently be made to the accompanying drawings wherein I have illustrated my novel method of producing moldings, but before proceeding with such detailed description, it should be understood that the invention may be applied to the production of various moldings other than the particular shapes illustrated in the drawings and that the method may be carried out by the use of various arrangements of suitable apparatus.

In general, my method proposes to use rolled strip metal stock for the production of the desired moldings and, as will be explained more fully hereinafter, is carried out by bending side portions of the strip inwardly with respect to an intermediate portion of the strip, whereby the intermediate portion forms the base of the molding and the side portions form wings which are adapted to be folded further to close the molding and to conceal attaching devices extending through the base. My method also contemplates carrying out the inward bending of the side portions of the strip as a progressive shaping which may or may not be accompanied by a thickening of the edges of the side portions and a shaping of the intermediate portion of the strip.

Rolled metal strips formed of various different metals may be employed in carrying out my method, so long as the strips possess the requisite degree of flexibility, durability, stiffness, and like qualities. I propose to use strips of rolled steel for this purpose, but possibly other metals or alloys could be used satisfactorily or advantageously. It is characteristic of the invention that by utilizing the materials and method steps now under consideration, there is, first, a decided saving in the cost of metal because the rolled strip stock is cheaper than the metals which are suitable for extrusion and, second, the use of extruding dies, which are at times very difficult and expensive to construct, is avoided.

In Fig. 1 of the drawings I have illustrated, more or less diagrammatically, one form of apparatus which may be used in producing moldings from strip metal stock according to my method. While various forms of apparatus may be used, the apparatus shown in this instance embodies a plurality of pairs of cooperating rolls 50 of appropriate size and shape which may be arranged in a series to progressively shape the strip stock 51 to the cross section desired in the completed molding as the strip stock is advanced between the rolls. The strip stock may be supplied to the forming rolls by being fed from a reel 52 at one end of the apparatus.

Before proceeding with the description of my novel method, I shall briefly describe a few of the different forms of moldings which may be produced by my method. One such molding is illustrated in Figs. 15 and 16 of the drawings and comprises a base portion 53, and wing portions 54 which are integrally connected to the base portion at the sides thereof. The wing portions 54 are adapted to be folded downwardly against the base portion 53, as shown in Fig. 16, to thereby close the molding and conceal attaching devices 55 which extend through the base portion. The base portion of this particular molding has been thickened by double folds 56 being formed in the metal of the base portion. These double folds extend longitudinally of the molding on opposite sides of the center line of the base portion, leaving a groove 57 therebetween which accommodates the attaching devices extending through the base portion.

In the molding shown in Figs. 15 and 16 the groove 57 is inside the molding, and the double folds 56 are on the outer surface of the base portion and form a rib exteriorly of the molding. This rib may fit into a depression in the body to which the molding is to be applied, and in addition to its serving to thicken and reenforce the base, it may also serve as a means for locating the molding and holding the same in place.

Portions of the metal of the wings may be folded inwardly upon itself, as shown in the drawings, to provide the wings with thickened edges 58. When the molding is closed by folding the wings down against the base the thickened edges of the wings engage the base and act as stops for limiting the extent to which the wings may be folded.

The molding shown in Figs. 28 and 29 is generally similar to that disclosed in Figs. 15 and 16, in that it includes a base portion 60, and wing portions 61 which are adapted to be folded further to close the molding and conceal the attaching devices 62. The molding of Figs. 28 and 29 differs from that of Figs. 15 and 16, however, in that the folded portions of the base which form the longitudinal rib 63 are the reverse of the corresponding folded portions of Figs. 15 and 16. That is to say, the longitudinal rib of Figs. 28 and 29 is interiorly of the molding and the groove 64 which accommodates the attaching device is on the outside of the base of the molding.

When the wings of this particular molding are folded to the closed position their free edges, which may or may not be thickened by folding the metal upon itself, engage the internal rib 63 and this rib acts as a stop for limiting the extent to which the wings can be folded.

The molding shown in Fig. 37 is of simpler form than the moldings of Fig. 15 and Fig. 28, in that the base portion 65 has been shaped to provide the same with a longitudinal groove 66 which accommodates attaching devices 67, but does not have the double folds shown in Figs. 15 and 28. The groove 66 may be formed interiorly of the molding as shown in Fig. 37 or, if desired, may be reversed and may be formed in the under side of the base portion.

Wings 68 extending along the sides of the base portion 65 may be folded further to the closed position shown in Fig. 38, and these wings may or may not be provided with thickened edges 69 formed by folding the metal upon itself.

The molding of Figs. 44 and 45 comprises simply a base portion 70, and wing portions 71 which may be folded to a closed position to conceal the attaching devices 72. The base and the edge portions of the wings have been thickened as shown in Fig. 44, and the bend or fold connecting the wings with the base is formed approximately along a line of minimum thickness.

Reverting now to my novel method, I have, in Figs. 3 to 14 inclusive, illustrated the progressive shaping of the strip stock 51 in producing the molding shown in Figs. 15 and 16. The method may be carried out with a larger or smaller number of rolls than is shown in the drawings or with various other arrangements of cooperating rolls. The progressive shaping of the strip stock into the molding shown in Figs. 15 and 16 may be carried out by first bowing the strip stock transversely to approximately the cross sectional shape shown in Fig. 3. This may be done by means of the cooperating rolls 80 and 81 acting upon opposite sides of the strip, the roll 80 having a peripheral groove therein and the roll 81 having a convex rim portion which presses the strip stock into the groove of the roll 80 as the strip stock passes between the rolls.

The cross sectional shape of the strip may then be changed to approximately that shown in Fig. 4 by the cooperating rolls 82 and 83 between which the strip stock is advanced. The rolls 82 and 83 may be provided, respectively, with cooperating inclined faces 84 and 85 which flatten side portions 86 of the strip and deflect the same downwardly and outwardly with respect to an intermediate portion 87. These rolls may also be provided, respectively, with a ridge 88 and a groove 89 which act upon the intermediate portion 87 and draw or shape the same into channel-like form as shown in Fig. 4.

The strip may then be advanced between cooperating rolls 90 and 91 which change the angular relation of the side portions 86 to the intermediate portion 87 so that the side portions extend more nearly horizontally from the intermediate portion, as shown in Fig. 5. These rolls may also have cooperating ridge and groove portions 92 and 93 which act on the channel-like intermediate portion 87 to change the same to a more nearly square cross section.

As shown in Fig. 6 of the drawings, the shape of the strip may next be changed by pinching the sides of the channel-like groove of the intermediate portion 87 toward each other by suitably arranged inclined rolls 94 and, at the same time, utilizing the faces 95 of the rolls 94 to change the angular relation of the wings 86 by lifting the same so that they extend upwardly and outwardly with respect to the intermediate portion 87. The rolls 94 may be assisted in this operation by means of a backing roll or anvil 96 having a groove 97 therein which receives the bottom of the intermediate portion 87.

In Fig. 7 I show how the sides of the intermediate portion 87 may be further pinched together by rolls 98 cooperating with a backing roll or shoe 99. The rolls 98 perform a function similar to that of rolls 94 but are arranged at a steeper angle.

As shown in Fig. 8, the strip may be acted upon next by cooperating rolls 100 and 101 which flatten down the sides 86 to an approximately horizontal position. The roll 101 may be provided with a groove 102 which is of a size to accommodate and support the intermediate portion 87, preferably without changing the shape of this portion.

Fig. 9 shows cooperating rolls 103 and 104 acting on the strip to flatten or compress the intermediate portion 87 to form a double fold 105 on each side of the longitudinal center line of the strip with a groove 57 therebetween, and thereby forming the external rib 106 on the bottom of the base portion of the molding. The flattening of the intermediate portion 87 in forming the rib 106 may be accomplished by providing the roll 104 with a shallow groove 107 in which the hollow rib is squeezed by the roll 103.

The rolls 103 and 104 may be further provided with corners 108 and tapered sections 109 which cooperate in deflecting side portions of the strip with respect to the intermediate portion of the strip and thereby start the formation of the wings 54. The roll 104 may also be provided with flanges 110 which cooperate with the ends of the roll 103 to deflect or turn the edge portions 111 of the wings 54 so that these edge portions may be subsequently folded inwardly to form the thickened edges 58.

In Fig. 10 I have shown how the edge portions 111 of the wings may be further folded inwardly by a pair of rolls 112 and 113 acting on each such edge portion, the rolls 113 being backing rolls for the rolls 112. During this shaping operation other portions of the strip preferably remain substantially unchanged and, while the rolls 112 and 113 are acting upon the edge portions, the strip may be supported and guided by the cooperating rolls 114 and 115 between which the strip passes. The rolls 114 and 115 may be located ahead of or to follow the groups of rolls 112 and 113.

In Fig. 11 I have illustrated the further shaping of the strip by an operation very similar to that illustrated in Fig. 10, and wherein the edge portions 111 of the wings are bent further inwardly by pairs of rolls 116 and 117, the rolls 116 being backing rolls for the rolls 117. While being acted upon by the rolls 116 and 117, the strip may be supported and guided between cooperating rolls 118 and 119 which may be located ahead of or to follow the groups of rolls 116 and 117. It will be understood, of course, that in the arrangement of rolls shown in Figs. 10 and 11, the rolls 113, and likewise the rolls 116, may be arranged in staggered relation to prevent interference between the roll acting on one edge of the strip and the roll acting on the other edge of the strip.

As shown in Fig. 12, the edge portions 111 may next be flattened down against the metal of the wings, thereby completing the thickened edges 58. This may be done by cooperating rolls 120 and 121 which act on the edge portions of the strip but which preferably do not otherwise change the shape of the strip.

In Fig. 13 I show how the wings 54 may now be bent upwardly with respect to the intermediate portion which forms the base portion 53, so that during a succeeding operation the wings may be folded part way inwardly to the position which they are to have in the completed molding. This change in the position of the wings 54 may be produced by cooperating rolls 122 and 123, the roll 123 acting on the inside of the strip and the roll 122 acting on the outside of the strip and having shoulders 124 which deflect or bend the wings 54 around the edges of the roll 123.

The wings 54 now extend substantially at right angles to the base portion 53 and are in position to be readily bent further inwardly to the position desired in the completed molding and, as shown in Fig. 14, this may be done by a roll 125 acting on each of the wings 54. While the wings are being bent inwardly by the rolls 125, the molding may be supported by a suitable backing roll or anvil 126 having a groove 127 which accommodates the external rib 106 of the molding.

In Figs. 17 to 27 inclusive I show the progressive shaping of a strip of rolled stock 130 to produce the molding shown in Figs. 28 and 29. As stated above, the molding of Fig. 28 differs from the molding of Fig. 15 only in that the rib of the base portion is formed interiorly of the molding instead of exteriorly as in Fig. 15. It will, therefore, be seen that the progessive shaping of the strip 130 in forming the molding of Fig. 28 may be carried out in a manner very similar to that already described. In Figs. 18 and 19 I show the strip 130 being subjected to substantially the same shaping operations as are disclosed in Figs. 3 and 4, with the exception that in Fig. 18 the edges of the strip are bowed upwardly instead of downwardly, and in Fig. 19 the side portions of the strip are deflected upwardly and outwardly with respect to the intermediate portion instead of downwardly and outwardly as shown in Fig. 4. In view of the similarity in these shaping operations, the rolls and parts of the strip shown in Figs. 17 to 27 have been designated with primed reference characters so far as they correspond with the rolls and parts of the strip shown in Figs. 3 to 14 inclusive.

In Fig. 20 the angular relationship of the side portions 86' is being changed as already explained in connection with Fig. 5, and in Fig. 21, the sides of the channel-like intermediate portion of the strip are being pinched together and at the same time the sides 86' are being flattened out to substantially horizontal position.

The further shaping of the strip, as illustrated in Figs. 22 to 27 inclusive, corresponds closely with the shaping operations explained above and illustrated in Figs. 10 to 14 inclusive and results in the flattening of the rib 106, and in the thickening of the edges of the strip and the bending of the side portions of the strip to form the wings 61. By the final shaping operation shown in Fig. 27 the wings 61 of the strip have been bent inwardly by the rolls 125' to substantially the position which they are to have in the completed molding shown in Fig. 28.

In Figs. 30 to 36 inclusive, I have illustrated the application of my method to the production of the molding shown in Figs. 37 and 38 from the strip metal stock 135. The shaping of the strip stock 135 to produce the molding of Fig. 37 is generally similar to the progressive shaping of the strip stock 51 and 130 as explained above in the production of the moldings of Figs. 15 and 28, but is somewhat simpler because the base of the molding is provided with a groove only and does not embody the double folds on each side of the longitudinal center line.

In Fig. 31 I show the initial shaping of the flat strip stock between cooperating rolls 136 and 137 whereby the groove 66 is formed in the intermediate portion of the strip and the extreme edge portions 139 of the strip are deflected angularly with respect to the general plane of the strip preparatory to these portions being folded inwardly to form the thickened edges 69 of the wings 68. The groove 66 may be formed by providing a projection or ridge 140 on one of the rolls, for example the roll 136, and a cooperating groove 141 on the other roll so that the sheet metal of the strip may be deflected into the groove 141 by the ridge 140 as the strip stock passes between the rolls. Flanges 142 may be provided at the ends of the roll 137 for angularly deflecting the edge portions 139 over the ends of the roll 136.

The further shaping of the strip as illustrated in Fig. 32 is similar to the shaping operations described in connection with and illustrated in Figs. 10 and 11, and in this step the edge portions 139 are bent inwardly with respect to the grooved intermediate portion. This inward bending of the edge portions 139 may be carried out by pairs of suitably arranged rolls 143 and 144, the rolls 143 being backing rolls for the rolls 144. A suitable roll 145 may be located adjacent to the pairs of rolls 143 and 144 for the purpose of supporting and guiding the strip during the inward bending of the edge portions.

Fig. 33 shows the edge portions 139 being flattened down between cooperating rolls 146 and 147 to complete the thickened edges 69. This operation is generally similar to the operation illustrated in Figs. 12 and 25.

The side portions of the strip, including the thickened portions 69, may next be bent out of the general plane of the strip to start the formation of the wings 68 of the finished molding and, in Fig. 34, I show rolls 148 and 149 cooperating to produce such deflection of the side portions of the strip. This may readily be accomplished by providing the rolls 148 and 149, respectively, with inclined faces 150, 151 which act upon opposite side portions of the strip as it passes between the rolls and deflect the side portions out of the plane of the strip, preferably upwardly, while the intermediate portion of the strip is supported between other cooperating portions of the rolls.

As shown in Fig. 35 the wing portions 68 may next be bent further to an approximately right angle position with respect to the intermediate portion of the strip, preparatory to the bending of the wing portions inwardly to the position which they are desired to have in the completed molding. The wings may be bent to this right angular position by cooperating rolls 152 and 153 as the strip passes between the same. The roll 152 is made short enough so that it may extend into the molding and hold the base thereof against the roll 153 and the latter roll may be provided with flanges 154 which bend the wings 68 around the ends of the roll 152.

The further shaping of the strip now only requires the deflecting or bending of the wings 68 inwardly with respect to the intermediate portion of the strip to the desired angular position, and this may be done as illustrated in Fig. 36, wherein the strip is supported by a backing anvil or roll 155 while a suitably arranged roll 156 acts upon each of the wings 68 to deflect the same to the desired angular position.

In Figs. 40 to 43 inclusive I have illustrated the production of the molding of Figs. 44 and 45 by my method, and it might be stated that the application of my method to the production of this type of molding is simpler because the base of the molding and the edges of the wings are not provided with folded parts but are thickened by distributing the metal of the strip in a different manner. In forming this molding, rolled strip stock such as the strip 160 shown in Fig. 39, is passed, while in a heated condition, between cooperating rolls 161 and 162. These rolls squeeze the strip and thereby distribute the metal to produce the desired thickening of the base portion 70 and the desired thickening of the edges 71. The roll 162 may be simply a cylindrical roll and the roll 161 may be provided with grooves 163 and 164 of appropriate contour which shape, respectively, the thickened base 70 and the thickened edge portions 71.

It will be noted, that in the operation illustrated in Fig. 40, the thickening of the base and the edge portions of the strip is accomplished by displacing metal into these portions and at the same time decreasing the thickness of the strip at the points 165 where bends are to be made in deflecting the wing portions 70 out of the plane of the strip. In Fig. 41 I have shown the initial bending of the side portions of the strip in forming the wings 71, which bending may be accomplished between cooperating rolls 166 and 167. In accomplishing this bending of the side portions, the intermediate portion of the strip may be supported between cooperating intermediate portions of the rolls and the wings may be deflected to an upwardly and outwardly extending angular position by cooperating inclined or tapering roll surfaces 168 and 169.

In Fig. 42 of the drawings I show the strip being subjected to the further shaping operation which has already been explained in connection with Figs. 13 and 35, wherein the wing portions 71 are bent further to approximately a right angular position with respect to the base of the molding. This may be accomplished by flanges 170 formed on a roll 171 so that these flanges bend the wing portions 71 around the ends of a roll 172 which extends into the molding and engages only the base thereof. In Fig. 43 the wings 71 are bent inwardly with respect to the base of the molding to the angular position which they are to have in the completed molding. This inward bending of the wings may be accomplished by an inclined roll 173 acting on the outside of each of the wings while the strip passes over and is supported by a backing roll or anvil 174.

It should be understood, that in the progressive shaping of the rolled strip stock to produce the above described molding, shaping steps may be used in greater or smaller number than I have disclosed and the shaping steps may be carried out in the sequence or order which I have disclosed or may be carried out in some other sequence or order.

From the foregoing description and accompanying drawings, it will now be readily understood that I have provided a novel method for rapidly and economically producing moldings from rolled strip stock wherein side portions of the strip are bent inwardly with respect to an intermediate portion of the strip, so that the intermediate portion forms the base of the molding and the inwardly bent side portions form wings which are adapted to be folded further to close the molding and conceal the attaching devices. It will be understood further, that this method provides for the forming of a groove in the base of the molding to accommodate the attaching devices, and also includes the thickening and reenforcing of the base and the edge portions of the wings. By means of the method herein disclosed it will be readily seen that moldings are produced with a minimum amount of a metal which is in itself of an inexpensive and readily available character, and that only simple and relatively inexpensive apparatus is required in carrying out the method. It will also be seen that my method provides for the production of moldings by progressive shaping steps constituting a substantially continuous operation in which the number and order of the steps can be readily varied according to the requirements or characteristics of the strip stock being worked or the particular molding shape being produced.

While I have illustrated and described my method of making moldings in a somewhat detailed manner, it should be understood, however, that I do not wish to be limited to any particular arrangement of apparatus for carrying out the method nor to the precise number and sequence of shaping operations herein disclosed, but regard my invention as including such changes and modifications as do not involve a departure from the spirit of the invention and the scope of the appended claims.

Having thus described my invention what I claim is:

1. The method of making molding of the character described, which comprises bending side portions of a strip of rolled metal stock inwardly with respect to an intermediate portion of the strip whereby said intermediate portion forms the base of the molding and said side portions form wings which are adapted to be folded further to close the molding, and folding the metal of said intermediate portion and thereby thickening the same and in the same operation forming a groove for attaching devices on one side of the base and a rib on the other side.

2. The method of making molding of the character described, which comprises bending side portions of a strip of rolled metal stock inwardly with respect to an intermediate portion of the strip whereby said intermediate portion forms the base of the molding and said side portions form wings which are adapted to be folded further to close the molding, folding portions of the metal of said wings inwardly upon itself to provide the wings with thickened edges, and folding the metal of the base on each side of the longitudinal center-line and thereby thickening the base and forming a groove in the same for attaching devices.

3. The method of making molding of the character described, which comprises bending side portions of a strip of rolled metal stock inwardly with respect to an intermediate portion of the strip whereby said intermediate portion forms the base of the molding and said side portions form wings which are adapted to be folded further to close the molding, and folding the metal of said intermediate portion and thereby forming a hollow rib interiorly of the molding which is adapted to be engaged by the wings when they are folded to the closed position.

4. The method of making molding of the character described, which comprises advancing a strip of rolled metal stock and forming a longitudinal hollow rib in an intermediate portion of the strip, and then flattening said hollow rib and bending side portions of the strip inwardly with respect to the intermediate portion whereby the intermediate portion forms the base of the molding and said side portions form wings which are adapted to be folded further to close the molding.

LEO L. WILLIAMS.